United States Patent [19]

Lyon

[11] 4,133,299

[45] Jan. 9, 1979

[54] SOLAR HEAT ABSORBER PLATE

[75] Inventor: Floyd A. Lyon, Brookville, N.Y.

[73] Assignee: Halm Instrument Co. Inc., Glen Head, N.Y.

[21] Appl. No.: 891,174

[22] Filed: Mar. 29, 1978

Related U.S. Application Data

[63] Continuation of Ser. No. 705,670, Jul. 15, 1976, abandoned.

[51] Int. Cl.² .............................................. F24J 3/02
[52] U.S. Cl. ................................. 126/271; 237/1 A; 165/166
[58] Field of Search ............... 126/270, 271; 237/1 A; 165/166

[56] References Cited

U.S. PATENT DOCUMENTS

| 1,119,063 | 12/1914 | Burnap ................................. 126/271 |
| 2,285,998 | 6/1942 | Morrison et al. ..................... 165/166 |
| 3,215,134 | 11/1965 | Thompson ............................. 126/271 |
| 3,399,664 | 9/1968 | Suhay .................................... 126/271 |
| 4,000,850 | 1/1977 | Diggs ..................................... 237/1 |

*Primary Examiner*—Kenneth W. Sprague
*Attorney, Agent, or Firm*—James P. Malone

[57] ABSTRACT

An absorber plate for water heating collectors. A cover sheet has a blackened upward surface for absorbing sunlight and a plurality of ridges on its lower surface. A back sheet has an equal number of grooves, the spacing of said grooves matching said ridges, the cover sheet and the back sheet being assembled so that the ridges nest in the grooves, the grooves being wider and shallower than said ridges so that a plurality of water passages partially bounded by the ridges and the grooves are formed when the cover sheet and the back sheet are assembled in nesting relation.

3 Claims, 4 Drawing Figures

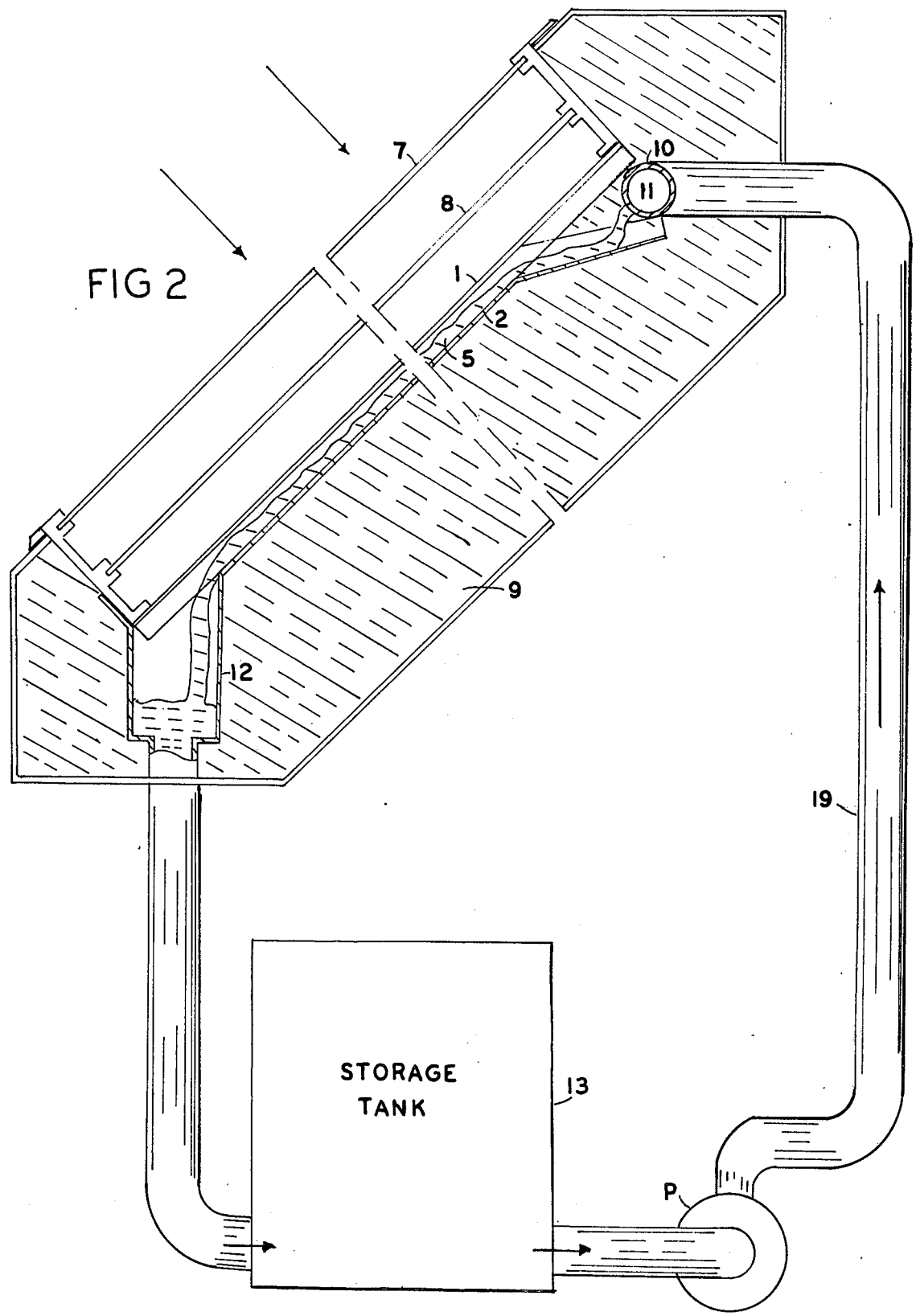

SOLAR HEAT ABSORBER PLATE

This is a continuation of application Ser. No. 705,670, filed July 15, 1976, now abandoned.

This invention relates to solar collectors in which sunlight striking the blackened surface of a metal absorber plate is converted to heat, and this heat is communicated to a water stream flowing in contact with the plate. Heat is lost from the plate to surrounding space in proportion to the temperature of the plate. Even when good heat resistance is provided on the front side and the back side, each degree Fahrenheit of plate temperature rise may result in more than half a percent additional loss from the plate. As a result of economic compromises, the heat flow path from the surface to the water stream may be several inches long, and if the material is thin, the thermal resistance will be substantial. Consequently, the temperature of the absorber may be twenty degrees or more hotter than the water, causing ten percent of loss or more in the heat collection process.

Heat collectors in which water is the heat transfer fluid are subject to freezing in winter. It is possible to protect a collector from freezing by draining it when not in use. This is relatively difficult in structures having convoluted tubular flow passages where slugs of water may be trapped and may freeze, damaging the tubing.

In solar collectors which have a free water path on the front side of an absorber plate, the water tends to degrade the blackened surface. Also, evaporation from the free surface causes heat losses and condensation on the translucent cover. The resulting fog of water droplets reduces the penetration of sunlight to the absorber plate.

A further significant consideration is cost. Solar collectors often entail much wasted metal and a substantial amount of fabrication, much of it in detailed hand work.

Accordingly, the primary object of this invention is to provide a solar heat absorber plate which is efficient, economic and durable.

A first contributing object is to provide a collector absorber plate having a very short heat flow path between its sunlight-absorbing surface and flowing heat transfer water.

A second contributing object is to provide a collector absorber plate which can be drained completely to avoid freezing and which has a water-impervious barrier between the water stream and the sunlight-absorbing surface.

Another object of the invention is to provide an absorber plate for water heating collectors, comprising a cover sheet having a blackened upward surface for absorbing sunlight, a plurality of ridges on the lower surface of said sheet, a back sheet having an equal number of grooves, the spacing of said grooves matching said ridges, said cover sheet and said back sheet being assembled so that said ridges nest in said grooves.

Another object is to provide a collector absorber plate which requires a minimum of fabrication and a minimum of material, and can be manufactured in quantity.

Other objects will be apparent to those skilled in the art from a reading of the accompanying drawings and the accompanying description.

FIG. 2 is a side section view showing how this absorber plate is used as a part of a complete solar collector.

Figure 1:
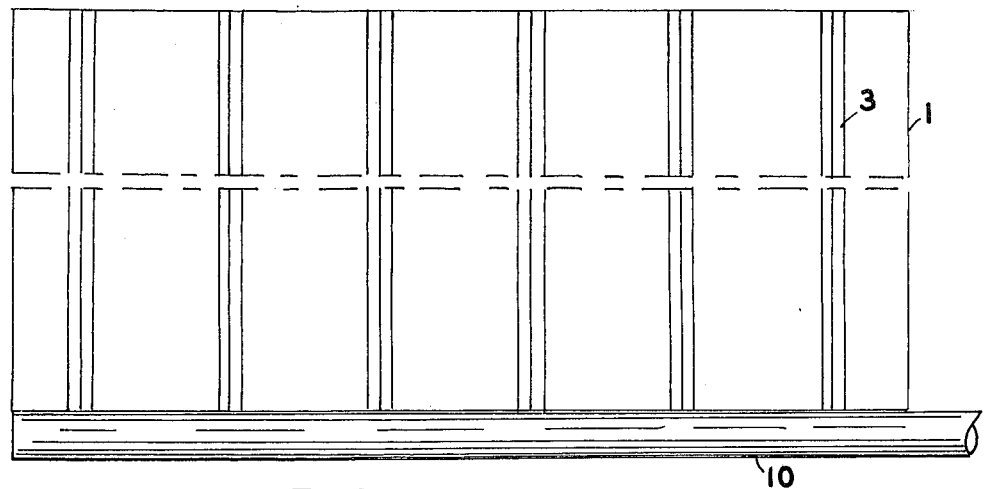
FIG. 1 is a top view of an embodiment of the invention.
Figure 1A:
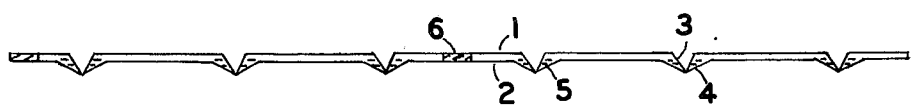
FIG. 1A shows a cross-section of FIG. 1.

In FIGS. 1 and 1A, the absorber plate is seen to consist of a blackened metal cover sheet 1, and a metal back sheet 2. The cover sheet has a series of parallel, equally V shaped ridges 3, of uniform depth. The back sheet has a matching series of parallel V shaped grooves 4, which have a more obtuse vertex angle and a shallower depth than the grooves 3, but have substantially identical spacing. In assembly, the cover sheet grooves 3, nest in the backsheet grooves, leaving wedge shaped passages through which heat transfer water 5, may flow.

Copper is the preferred metal for cover sheet 1, and for back sheet 2, because it is corrosion resistant and readily conducts heat. Sheets as thin as 0.005 inch are suitable. The grooves may then be spaced at one inch spacing. They should be shallow to conserve material, but must be deep enough to pass enough heat transfer water. A depth of about 5/32 inch for the grooves 3, and ⅛ inch for the grooves 4, has been found suitable.

The back sheet may also be made of non-metallic material, and it need not be thin. Thus, for example, it may be cast or extruded of plastics or of ceramic tile or cement, or it may be fabricated as a composite material. The essential properties are that it should be impervious and durable to hot water, that it should be able to withstand the temperature range expected and that it should be economical when formed with grooves 4, fitting the ridges 3, of the cover sheet.

The absorbent black coating can be any durable low-reflectance coating which will withstand the temperatures, up to 375° F., which may be encountered in service when heat transfer water is not circulating, and may be a copper oxide coating which absorbs sunlight but radiates infra-red poorly. The grooves in the absorbing surface contribute a little to the absorption of sunlight by providing multiple reflections of incident light, but they also increase the emmissivity at infra-red wavelength a little.

Because the water 5, runs substantially in the grooves 4, there are many possible ways of fastening the cover sheet 1, and the back sheet 2, together. These include rivets, staples, and screws, as well as clamps which extend around the periphery. The preferred means are spots 6, of high temperature tolerant cement, such as silicone sealant. Cementing requires a minimum of fabrication effort and leaves the sheets impervious to water. The same cement can also be used to seal the side edges of the absorber plate.

FIG. 2 shows the absorber plate of FIG. 1 employed in a collector which is supported at the characteristic angle with the horizontal best suited to the latitude of the installation. The section view reveals two translucent covers, 7 and 8, which slow the escape of heat from the front while permitting the entrance of sunlight, and a layer of insulation 9, on the back. At the top is a header tube 10, having a series of small holes 11, spaced horizontally at the spacing of the grooves 4. This header serves to distribute the water flow uniformly across the width of the absorber plate, the grooves 4 guide the water so it does not shift or bunch horizontally as it flows down the length of the collector. At the bottom is an insulated receiver trough 12, which catches heated water which has passed through the absorber plate.

Heated water from trough 12, flows down to storage tank 13. A pump P raises water from tank 13, back to the header tube 10, via pipe 19, when heat is to be collected from the absorber plate. Utilization means of various sorts, not shown, may be provided to use the heat stored in tank 13, as is well known in the art.

Figure 3:
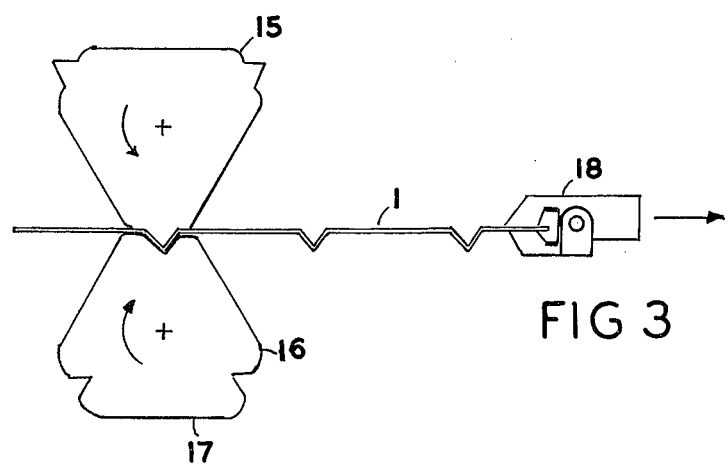
FIG. 3 is a schematic diagram of a preferred manufacturing process for making the components of the absorber plate.

Because the ridges 3, of sheet 1, must nest in the grooves 4, of sheet 2, they must be straight and equally spaced to a close tolerance. Various methods which form a single groove at one hit are suitable. Roller methods are not suitable because they tend to gather the sheet with consequent distortions and difficulties in guiding the sheet to produce straight grooves. Large die methods which form several or all the grooves of a sheet in a single operation produce substantial stretching of the material which may damage the coating, tear the sheet or promote stress corrosion. Therefore, FIG. 3 shows the preferred method of forming the sheets.

The sheets 1, are fed between a toothed roller 15, and a grooved roller 16, which press in the grooves. The land between grooves is relieved as at 17, so that the sheet is released after every forming nip. Driven grippers 18 synchronized with the rollers draw the front edge of the sheet to produce accurate uniform spacing of the grooves. The grippers may have spring relief so that they do not impede gathering of the sheet during forming.

The grooves and ridges are not limited to V shapes, but may be other equivalent shapes, for instance, semicircular.

I claim:

1. Absorber plate means for liquid heating collectors, comprising, a cover sheet having a blackened upward surface for absorbing sunlight, a plurality of straight parallel ridges on the lower surface of said sheet, an independent back sheet attached to the cover sheet only at its outer edges having an equal number of straight parallel grooves, the spacing of said grooves matching said ridges, and the height of said ridges substantially matching the depth of said grooves, said cover sheet and said back sheet being assembled so that said ridges nest in said grooves, the size of the grooves being small with respect to their spacings, and a header tube connected perpendicularly to said grooves to feed liquid to said grooves so that the liquid flows only in one direction in said absorber plate, whereby good heat exchange contact is made between liquid and said absorber plate when said grooves are full of said liquid and when said grooves are only partly full of said liquid.

2. The absorber plate of claim 1, in which said grooves are wider and shallower than said ridges so that a plurality of water passages partially bounded by said ridges and said grooves are formed when said cover sheet and said back sheet are assembled in nesting relation.

3. The absorber plate of claim 2, in which said cover sheet is of thin metal, and said ridges and said grooves are straight, parallel, equally spaced, and of substantially V-shaped cross-section, said ridges being all of the same height and apex angle and said grooves being all of the same lesser depth and greater apex angle than said ridges.

* * * * *